April 3, 1934.  K. HOFFMANN  1,953,713
FILM COOLING DEVICE
Filed Sept. 12, 1931
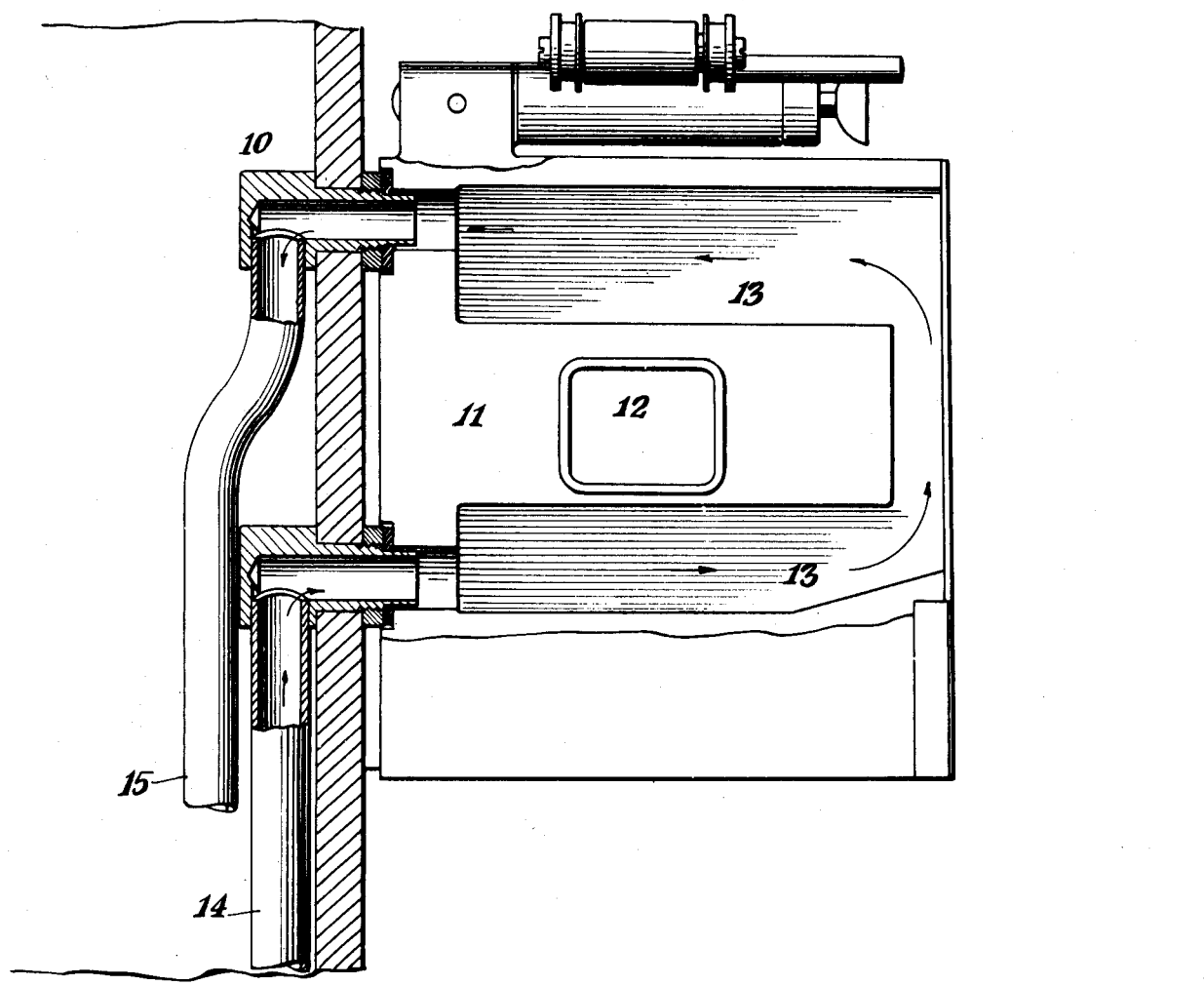

Patented Apr. 3, 1934

1,953,713

UNITED STATES PATENT OFFICE 1,953,713

FILM COOLING DEVICE

Kurt Hoffmann, Dresden, Germany

Application September 12, 1931, Serial No. 562,451
In Germany January 10, 1930

1 Claim. (Cl. 88—17)

The present invention relates to improvements in cooling devices for the film guide carriers of cinematographic projectors, and it is the principal object of my invention to provide a water cooling device for the film guide carriers. In cinematographic projection apparatus, particularly such in which arc lamps of high intensity are used, the film guide carrier is particularly strongly heated, and it has been discovered that the heat developed may under certain circumstances reach a temperature of 100° C. at which temperature the film may readily be ignited.

In order to avoid an ignition of the film in the film window it has been proposed to blow a strong current of air against the same. This, however, is not enough to cool off the film guide carrier in its entirety sufficiently because the material in which the heat is stored is too voluminous and because the air is comparatively slow in absorbing heat. While it is, therefore, possible to protect the film in the window against ignition by an air cooling device, it will not be possible to cool the film guide carrier over its entire body, as the bulk of the carrier in which the heat is stored is too voluminous for materially cooling it by air, and the heat remaining in the carrier will continuously give off heat to the entire operating mechanism of the apparatus, and will contribute to diffuse the lubricant or thinning the lubricating agent so as to make it useless.

It has, therefore, also been proposed to submerge the film guide in a water bath, however, in practice this will be found inexpedient, as the water would soon start to boil and destroy the entire film.

Even if a film material were discovered or made which could withstand hot water, a great many other difficulties would be encountered, difficult to overcome, and, moreover, the film carrier would not be cooled off thereby.

It is, therefore, the object of the present invention to shape the film guide carrier as a closed hollow body, through which the cooling water is flowing without the film itself coming into contact with the water, by arranging the film guide means on the outside of this closed hollow body.

This construction will result in an efficient cooling off of the carrier for the film guide means, and will protect the mechanism of the machine against absorption of any or of a very small part of the heat.

An air cooling system may simultaneously be used with my water cooling device which, however, does not act as a bulb for absorbing the heat of a light cone.

Another object of my invention is the provision of a water cooling device for the carrier of the film guide means of comparatively simple and inexpensive construction, yet durable and highly efficient in operation.

These and other objects and advantages of my invention will become more fully known as the description thereof proceeds, and will then be specifically defined in the appended claim.

In the accompanying drawing forming a material part of this disclosure:

The single figure is a fragmentary front elevation of a cinematographic projector equipped with a water cooling device constructed according to my invention.

As illustrated, the body or housing 10 of a projection apparatus containing the usual operating mechanism has attached thereto the carrier 11 for the film guide means having a window 12. The carrier 11 is shaped to form a hollow jacket 13, and water is supplied to this jacket by means of the pipe 14 from any source of water supply, while the waste water is discharged through pipe 15, and both pipes are guided through the housing 10 of the operating mechanism.

The operation of my device will be entirely clear from the above description by referring to the drawing, and it will be evident that the water continuously circulating through inlet pipe 14, jacket 13, and discharge pipe 15 will keep the film carrier, film and its guide means cool and protect the film against ignition.

It will be understood that I have disclosed the preferred form of my device only as one example of the many possible ways to practically construct the same, and that I may make such changes in its general arrangement and in the construction of the minor details thereof as come within the scope of the appended claim without departure from the spirit of my invention.

Having thus described my invention, what I claim as new and desire to secure by Letters Patent is:

In a device of the character described, a housing, a carrier for a film band guide extending from a wall of said housing and formed with a window spaced from its ends and upper and lower edges, portions of the carrier being hollow to form a water jacket having portions extending transversely of the carrier above and below the window and connected by a vertically extending portion at the opposite side of the window from the housing, couplings extending through the side wall of said housing with their outer ends engaged in adjacent ends of the upper and lower portions of said water jacket to secure the carrier to the wall of the housing, and pipes connected with inner ends of said couplings for circulating water through the water jacket.

KURT HOFFMANN.